Aug. 7, 1962   G. W. PURDY   3,047,969
LAND LEVELER
Filed Nov. 27, 1959   2 Sheets-Sheet 2

George W. Purdy
INVENTOR.

BY *Clarence A. O'Brien*
*and Harvey B. Jacobson*
Attorneys

United States Patent Office 3,047,969
Patented Aug. 7, 1962

3,047,969
LAND LEVELER
George W. Purdy, 601 S. Jefferson St., De Witt, Ark.
Filed Nov. 27, 1959, Ser. No. 855,923
7 Claims. (Cl. 37—150)

The invention generally relates to a land leveler and more particularly to such a device that is adapted to be attached to a conventional farm tractor having a hydraulic pressure system.

In certain areas and under certain conditions, it is desirable to smooth off or completely level the surface of the soil prior to planting a crop. One example of this is the planting of rice in which the soil must be substantially level so that the levees employed for irrigation flooding may be easily formed by following the high spots in the usual manner of building levees in a flood-type irrigation system. The primary object of the present invention is to provide a land leveling device having a plurality of angulated blades mounted thereon in longitudinally spaced relation whereby the blades will move the soil a plurality of times in a lateral direction during passage over the ground surface, the blades being rigidly mounted on an elongated framework supported by simultaneously vertically movable supporting wheels that are hydraulically raised and lowered by a single hydraulic piston and cylinder assembly receiving its power from the hydraulic system of a tractor and being controlled by the operator of such a tractor.

Another object of the present invention is to provide a land leveler having an elongated truss-type rigid frame with a multiplicity of blades thereon and vertically adjustable corner wheels which are vertically adjustable simultaneously with the length of the frame providing for leveling of the soil surface with very little irregularity caused by uneven areas.

A further object of the present invention is to provide a land leveler having angulated rigid blades mounted thereon with the lower edge of the blades and the lower edge of the frame being substantially coincidental, the angulation of the blades providing for ease of movement of the soil from blade to blade thereby permitting the leveler to be employed for leveling ground in moist or wet condition which cannot be accomplished with transversely arranged blades.

Another important object of the present invention is to provide a land leveler in accordance with the preceding objects in which the vertically adjustable front wheels are provided with a castor-type assembly which will enable the front wheels to pivot or swing when the tractor or towing vehicle proceeds around a curve and will also swivel to enable the device to be pulled over the road when all of the wheels are lowered for elevating the frame.

Yet another feature of the present invention is to provide a land leveler having rigid blades mounted thereon in which each of the blades is provided with a detachable lower cutting edge.

Still other objects of the present invention will reside in its extreme simplicity of construction, ruggedness, efficiency of operation, ease of repair and its relatively inexpensive manufacture and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
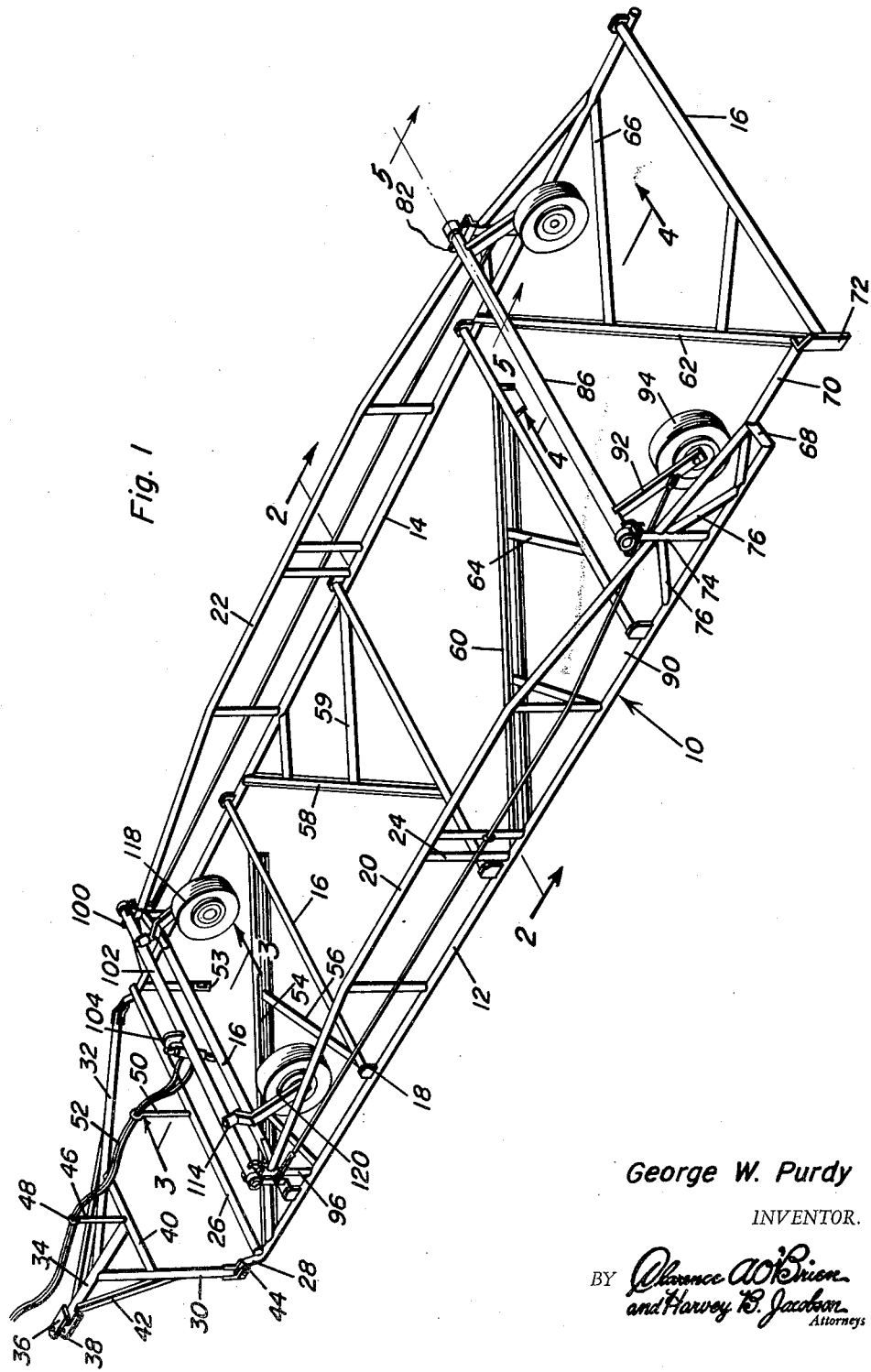
FIGURE 1 is a perspective view of the land leveler of the present invention.
Figure 2:
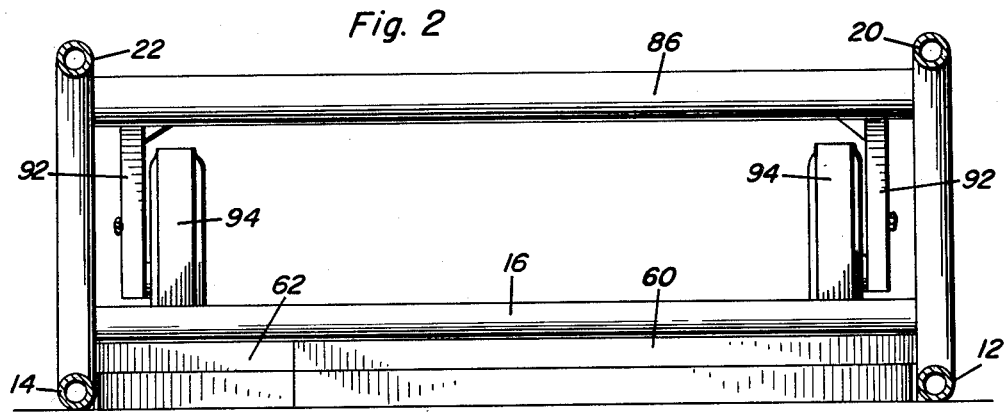
FIGURE 2 is a transverse, vertical sectional view taken substantially upon a plane passing along section line 2—2 of FIGURE 1 illustrating the details of construction of the frame and the relationship thereof to the blades.

Referring now specifically to the drawings, the numeral 10 generally designates the land leveler of the present invention which includes a pair of elongated and parallel bottom side frame rails 12 and 14 which may conveniently be in the form of tubular pipes. Interconnecting the side frame rails 12 and 14 at longitudinally spaced points are transverse tubular frame rails 16 secured to brackets 18 extending upwardly from the side frame rails 12 and 14 thereby providing a rigid framework. Extending longitudinally above the side frame rails 12 and 14 is a pair of arch rails or truss rails 20 and 22 which have a plurality of vertical brace members 24 extending between the rails 12 and 20 and the rails 14 and 22 respectively. This also serves to rigidify the entire framework.

The forward end of the framework and particularly the rails 12 and 14 is provided with a transverse forward rail 26 similar to rails 16 and the forward ends of the rails 12 and 14 are upturned as indicated by numeral 28. The upturned ends 28 are pivotally connected to converging rails 30 and 32 that are joined to a forwardly extending tongue 34 having a U-shaped yoke or spaced plates 36 on the outer end thereof. The plates 36 have aligned apertures 38 for receiving a drawbar therebetween whereby a pin may be inserted through the apertures 38 and an aperture in the drawbar for attaching the tongue 34 to the drawbar of a tractor or other suitable towing vehicle. The rear end of the tongue 34 is provided with a transverse brace member 40 interconnecting the converging rails 30 and 32. Also, brace members 42 are provided between the rail 30 and the tongue 34 and the rail 32 and tongue 34 thus providing a rigid substantially A-shaped attachment framework having rearwardly extending lugs 44 on the rear ends thereof for pivotal engagement with the forward ends of the upturned end portions 28.

The transverse brace member 40 is provided with an upstanding standard 46 having a loop 48 on the top thereof and the transverse rail 26 is provided with a similar upstanding brace or standard 50 which supports the hydraulic fluid pressure lines 52 extending rearwardly from the tractor to the land leveler.

Supported behind the forward end of the land leveler is a short angulated blade 53 carried by said rail 14 and transverse rail 16 and also a blade 54 which has one end attached to the side frame rail 12 adjacent the upturned forward end thereof at 28. The blade 54 extends rearwardly and inwardly and is held in position by a pair of braces 56 whereby the free end of the blade 54 will terminate in spaced relation to the other side frame rail 14 and provide a relatively acute angle in relation to the material engaging the blade 54 causing the material to be discharged from the free end of the blade 54 for engagement by a trailing blade 58 which is also inclined but which is inclined in the opposite direction and is supported by brace members 59. The free end of the blade 58 terminates in spaced relation to the side rail 12 for discharging material onto the rear blade 60 and the material is discharged from the blade 60 into the rearmost blade 62. The blade 60 is supported by a pair of brace members 64 while the blade 62 is supported by a pair of brace members 66 one of which goes to the frame rail 14 and one of which is connected to the rearmost transverse brace member 16. The rear end of the side frame rail 12 is provided with an upstanding portion 68 joined to a horizontal portion 70 disposed above the plane of the blade 62 with the horizontal portion 70, the blade 62 and the rear transverse frame rail 16 all being connected to a vertical angulated plate 72 whereby the plate 72 and the upwardly offset portions 68 and 70 provide an exit for the soil so that any excesses of soil may be discharged laterally of the path of movement of the leveler.

The particular arrangement of rigid blades will assure that the soil will be moved four times during passage of the land leveler and the soil will travel in a generally zigzag pattern and as it is rolled back and forth laterally as it moves longitudinally, the soil moved by the blades will fill up any low pockets or low areas in the surface of the soil and the blades will cut off and level any high areas.

Disposed adjacent the rear end of the frame, each side rail 14 and 12 is provided with an upstanding tubular standard 74 having braces 76 connected thereto and the standard 74 also extends upwardly through and above the upper frame rails 20 and 22. The supporting plate of angular construction 78 is attached to the upper end of the standard 74 and a supporting plate 80 is carried by the plate 78 and is provided with upstanding lugs 82 which receive and hold stationary a cylindrical sleeve 84 which journals a transverse pipe 86. Rigidly attached to the transverse pipe or axle 86 is a pair of trailing support arms 92 each of which has journaled on the outer end thereof a ground engaging supporting wheel assembly 94 which may conveniently be a pneumatic tire and wheel such as used in conjunction with farm machinery. Operating cables 90 have their rear ends connected to respective arms 92 in spaced relation to the axle 86. Thus, by moving the cables, the transverse axle or pipe 86 may be rotated and the wheel assemblies 94 may be raised and lowered thus raising and lowering the rear portion of the frame.

Adjacent the front of the frame, there is also provided an upstanding standard 96 on each of the side frame rails 12 and 14 which standard has a supporting plate 98 on the upper end thereof carrying bearing sleeves 100 for a transverse axle or pipe 102 which is parallel to the axle or pipe 86 and at substantially the same elevation. Centrally disposed on the axle or pipe 102 is an offset arm 104 rigid therewith to which is attached a fluid operated piston and cylinder assembly 106 of the double acting type with the lower end of the piston and cylinder assembly being connected to a lug 108 on the lower transverse pipe frame member 16. Thus, by the operator admitting and exhausting hydraulic pressure from the piston and cylinder assembly 106, the transverse axle or pipe 102 may be rotated about its longitudinal axis.

The outer ends of the axle 102 are each provided with a depending offset arm 110 having a short piece of chain 112 attached thereto by virtue of a U-shaped loop and hook carried thereby which hook engages the chain in an adjustable manner and the cable 90 is attached to the chain by suitable cable clamps.

Figure 3:
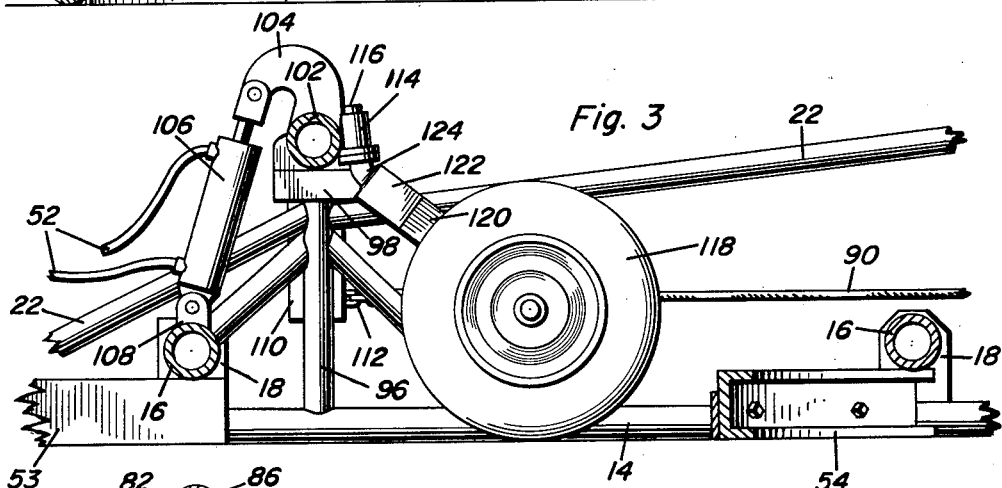
FIGURE 3 is a detailed sectional view taken substantially upon a plane passing along section line 3—3 of FIGURE 1 illustrating further details of the front wheel assembly forming a part of the land leveler.
Figure 4:
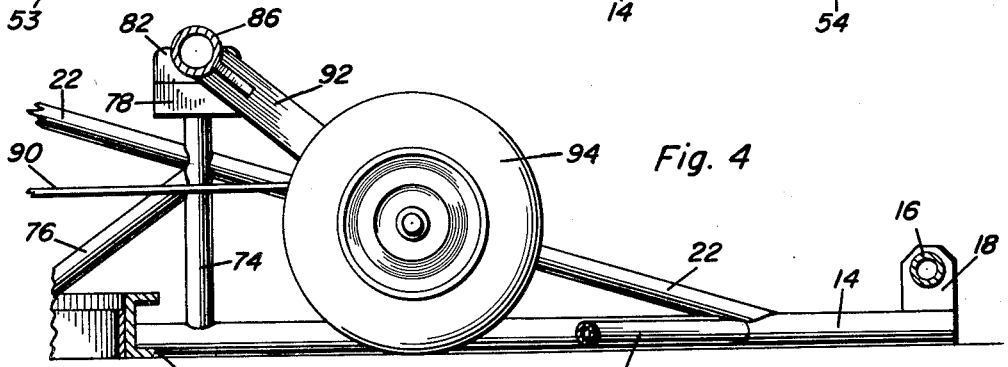
FIGURE 4 is a detailed sectional view taken substantially upon a plane passing along section line 4—4 of FIGURE 1 illustrating further details of the rear wheels for the land leveler.
Figure 5:
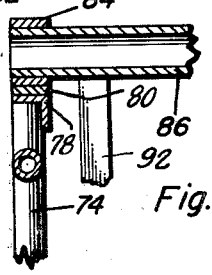
FIGURE 5 is a detailed sectional view taken substantially upon a plane passing along section line 5—5 of FIGURE 1 illustrating the manner of raising and lowering the rear wheels.

Rigidly attached to the transverse pipe or axle 102 is a sleeve bearing 114 which pivotally journals a mounting pin 116 of a front wheel assembly which includes a front wheel unit 118 supported by an arm 120 having an offset upper end portion 122 which is also offset rearwardly or angulated rearwardly in relation to the axis of the pin 116 due to an angulated portion 124 at the lower end of the pin 116. Thus, the wheels 118 are free to swivel or castor about the axis of the pin 116. When the frame and blades are lowered, as in FIGURE 3, the pin 116 is slightly inclined forwardly and when the wheels 118 are lowered and the frame elevated, the wheels 118 will still castor in the proper manner even though the pin 116 receives a slight rearward inclination. This construction enables the frame to be elevated and the device towed by a suitable towing vehicle over the road thus facilitating the handling of the leveler.

The tractor operator will control the operation of the land leveler since by controlling the fluid pressure supply and exhaust from the piston and cylinder arrangement 106, the leveler may be elevated for over the road transport by expanding the piston and cylinder arrangement 106 which will lower the wheels 118 and 94 and as the tractor or towing vehicle proceeds around a curve, the front wheels 118 will pivot about the axis of the pins 116 thus permitting the land leveler to follow the towing vehicle. The land leveler transports easily by truck or car for long trips by simply blocking the framework in an elevated position without requiring the use of any hydraulic equipment.

The interconnecting cables 90 assure that all of the wheels will move simultaneously for maintaining the relationship of the wheels and the frame. When it is desired to use the device for land leveling, the piston and cylinder assembly 106 is contracted thus elevating the wheels 118 and 94 and letting the frame rest upon the soil surface with the blades 53, 54, 58, 60 and 62 engaging the surface. During forward movement of the tractor and the land leveler, the soil will be moved laterally and longitudinally susbtantially in a zigzag path thus effectively leveling off or filling any pockets and high spots and also permitting the device to be used with wetter soil due to the angle of inclination of the blades which will assure movement of the soil through the land leveler. The angle of the blades also enables the machine to work in soil having a large percentage of straw, weeds, stubble or the like. Such material passes through the machine without choking which requires stopping for cleaning.

Another factor concerning the importance of the blades and the arrangement thereof is the fact that if a rigid obstruction is engaged by the blades, for example a rock, stump or the like which was not observed by the tractor operator, such an obstruction will not damage the land leveler since the inclination of the blades will permit the land leveler to pass the obstruction by virtue of the obstruction sliding along the surface of the land leveler while forcing the land leveler to move laterally. In other words, the land leveler would move in a zigzag relationship. This prevents such an obstruction from damaging the land leveler. If the dirt fills up too much in front of the blades, the operator of the tractor may slightly elevate the frame and the blades by lowering the wheels a slight amount thus permitting the tractor to operate at the most effective speed for accomplishing the most effective land leveling and for leveling the greatest possible area in a given time. The orientation of the side frame rails 12 and 14 substantially coincidental with the blades permits the rails 12 and 14 to act somewhat like skids which is further facilitated by the upturned ends 28 thus enabling the device to proceed over an elevated area during transport even though such elevated area may engage the frame in the center thereof.

The chain and hook combination for attaching the cable to the front arm 110 will shorten or elongate the cable as needed to orientate the rear end of the leveler level with the front end. Also, the bearing support plate 82 is bolted onto the support plate 78 for easy removal of and repair of the bearings when required. The leveling or floating of the soil is accomplished quite rapidly by the blades and the zigzag movement of the soil and the angulation of the blades permits damp soil to move down the front surface of the blades whereas straight across blades employed in other types of floats do not permit this movement or floating of damp soil. The zigzag movement of the soil also serves to pack soil in pockets or low places thereby reducing the degree of settling of the fill dirt after a rain.

Also, the front spindles 116 are supported by a suitable thrust bearing which carries the load and on which the front wheel swivels. One other important result of the zigzag and multiple movement of the soil is that the soil will be broken up or pulverized by such rolling movement thereby effecting somewhat of a cultivating action which breaks up clods and leaves the soil in better condition for receiving plants. The short blade 53 is disposed in front of the right front wheel 118 and its purpose is to level a path or track for that wheel so that all four wheels run on the same level at all times, otherwise, the right front wheel would run in rough ground. Also, the orientation of the supporting wheels adjacent the corners of the frame provide more effective support of the device in that any three wheels will support the frame in a level condition and the wheels adjacent the corners prevent the frame from digging into elevated areas over which it may pass.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A land leveling device comprising an elongated frame including a pair of parallel side frame rails and a plurality of transverse frame rails rigidly interconnected with the side rails thereby forming an elongated rigid frame, said transverse frame rails being disposed above the plane of the side rails whereby the side rails form runners for the frame, a transverse rear axle mounted on the frame for rotational movement about its longitudinal axis, a transverse front axle mounted on the frame for rotational movement about its longitudinal axis, means interconnecting the axles for simultaneous rotational movement thereof, means interconnecting the front axle and the frame for rotating the front axle about its longitudinal axis, a pair of supporting arms on the rear axle, rear wheels mounted on the supporting arms on the rear axle for movement in vertical planes about the rear axle when the rear axle is rotated, a pair of upright sleeves rigidly mounted on the front axle, supporting arms freely pivotally mounted in said sleeves for rotation about generally vertical axes, each supporting arm having a front wheel mounted on the end thereof remote from the sleeve, said supporting arms being received in the sleeves for pivotal movement independently of each other and freely in relation to the sleeve and front axle whereby rotation of the front axle will cause vertical swinging of all of the wheels and change in inclination of the angle of pivotal movement of the supporting arms for the front wheels, a plurality of blades mounted on the frame, alternate blades having one end thereof attached to the side rails and the opposite ends thereof spaced laterally inwardly from the side rails, the longitudinal axes of the blades being inclined rearwardly in relation to the side rails, the rearmost blade extending completely between the side rails, the portion of the side rail adjacent the rear end of the rearmost blade being offset upwardly to permit exit of material from in front of the rearmost blade.

2. The structure as defined in claim 1 wherein the lower edges of the blades are substantially in the same horizontal plane as the lower edges of the side rails whereby the side rails will confine the soil being moved by the blades.

3. A land leveler comprising an elongated rigid frame, elevatable wheel means mounted on said frame adjacent both ends thereof and adjacent both sides of the frame for selectively supporting both ends of the frame from the ground surface, said frame including side rails for supporting the frame when the wheel means is raised thereby allowing the frame to slide on the ground surface, means at the forward end of said frame for connection with a towing vehicle, means interconnecting the frame and the wheel means for raising and lowering the wheel means, and a plurality of elongated blades mounted on said frame, the longitudinal axis of the blades being in rearwardly inclined relation to the longitudinal axis of the frame, said blades having the bottom edges thereof permanently disposed in the same horizontal plane as the lower edge of the frame with the blades and frame forming an enlarged rigid unit for leveling the surface of soil preparatory to planting, said wheel means including a pair of front castor wheels, each castor wheel having a supporting arm journaling the wheel, the supporting arm having an offset portion provided with an upwardly extending angulated pivot pin, a transverse pivotal axle, a pair of upright sleeves rigidly mounted on said axle receiving the pivot pins, said means for elevating the castor wheels including a piston and cylinder assembly interconnecting the frame and the tranverse axle for pivoting the axle about its longitudinal axis thus swinging the wheels in a vertical plane and changing the angle of the sleeves and pivot pins, a rear axle mounted in parallel relation to the front wheel supporting axle, trailing arms on the rear axle, a wheel on each trailing arm, means rotatably supporting the rear axle on said frame, and means interconnecting the rear and front axles for rotating the axles together thus raising and lowering the wheels simultaneously.

4. The structure as defined in claim 3 wherein the forwardmost pair of blades are disposed forwardly of the front wheels for protecting the front wheels from engagement with uneven terrain thereby enabling the surface of the land to be more effectively leveled without variation due to unevenness of the surface.

5. The structure as defined in claim 1 including a truss assembly mounted on and projecting above each of the side frame rails thereby additionally rigidifying the frame of the land leveling device.

6. A land leveling device comprising an elongated frame including a pair of parallel side frame rails and a plurality of transverse frame rails rigidly interconnected with the side rails thereby forming an elongated rigid frame, said transverse frame rails being disposed above the plane of the side rails whereby the side rails form runners for the frame, a transverse rear axle mounted on the frame for rotational movement about its longitudinal axis, a transverse front axle mounted on the frame for rotational movement about its longitudinal axis, means interconnecting the axles for simultaneous rotational movement thereof, means interconnecting the front axle and the frame for rotating the front axle about its longitudinal axis, a pair of supporting arms on the rear axle, rear wheels mounted on the supporting arms on the rear axle for movement in vertical planes about the rear axle when the rear axle is rotated, a pair of upright sleeves rigidly mounted on the front axle, supporting arms freely pivotally mounted in said sleeves for rotation about generally vertical axes, each supporting arm having a front wheel mounted on the end thereof remote from the sleeve, said supporting arms being received in the sleeves for pivotal movement independently of each other and freely in relation to the sleeve and front axle whereby rotation of the front axle will cause vertical swinging of all of the wheels and change in inclination of the angle of pivotal movement of the supporting arms for the front wheels, a plurality of blades mounted on the frame, alternate blades having one end thereof attached to the side rails and the opposite ends thereof spaced laterally inwardly from the side rails, the longitudinal axes of the blades being inclined rearwardly in relation to the side rails.

7. The structure as defined in claim 6 including a rigidifying truss assembly mounted on and projecting above each of the side frame rails.

(References on following page)

References Cited in the file of this patent
UNITED STATES PATENTS

| | | |
|---|---|---|
| 425,793 | Holland | Apr. 15, 1890 |
| 982,309 | Smith et al. | Jan. 24, 1911 |
| 1,317,037 | Samdahl | Sept. 23, 1919 |
| 1,711,350 | Hughes | Apr. 30, 1929 |
| 1,743,532 | Crow et al. | Jan. 14, 1930 |
| 1,797,288 | Gustafson | Mar. 24, 1931 |
| 1,864,042 | Fisher | June 21, 1932 |
| 2,093,766 | Rich | Sept. 21, 1937 |
| 2,101,567 | Winsor | Dec. 7, 1937 |
| 2,160,193 | Arndt | May 30, 1939 |
| 2,513,129 | Allison et al. | June 27, 1950 |